United States Patent
Zhang et al.

(10) Patent No.: US 8,204,842 B1
(45) Date of Patent: Jun. 19, 2012

(54) SYSTEM AND METHOD FOR IMAGE ANNOTATION AND MULTI-MODAL IMAGE RETRIEVAL USING PROBABILISTIC SEMANTIC MODELS COMPRISING AT LEAST ONE JOINT PROBABILITY DISTRIBUTION

(75) Inventors: Ruofei Zhang, Sunnyvale, CA (US); Zhongfei Zhang, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 0 days.

(21) Appl. No.: 12/903,099

(22) Filed: Oct. 12, 2010

Related U.S. Application Data

(63) Continuation of application No. 11/626,835, filed on Jan. 24, 2007, now Pat. No. 7,814,040.

(60) Provisional application No. 60/763,848, filed on Jan. 31, 2006.

(51) Int. Cl.
*G06F 17/00* (2006.01)

(52) U.S. Cl. .......................................... 706/45

(58) Field of Classification Search .................... 706/12, 706/21, 45, 52; 382/155, 181, 224–225, 382/190
See application file for complete search history.

(56) References Cited

U.S. PATENT DOCUMENTS

| | | | |
|---|---|---|---|
| 5,274,737 A | 12/1993 | Shinoda | |
| 5,479,572 A | 12/1995 | Marcantonio | |
| 5,590,242 A | 12/1996 | Juang et al. | |
| 5,664,059 A | 9/1997 | Zhao | |
| 5,794,192 A | 8/1998 | Zhao | |
| 5,806,029 A | 9/1998 | Buhrke et al. | |
| 5,844,305 A | 12/1998 | Shin et al. | |
| 6,070,140 A | 5/2000 | Tran | |
| 6,895,115 B2 | 5/2005 | Tilton | |
| 7,006,944 B2 | 2/2006 | Brand | |
| 2002/0116196 A1 | 8/2002 | Tran | |
| 2003/0081833 A1 | 5/2003 | Tilton | |
| 2004/0054542 A1 | 3/2004 | Foote et al. | |
| 2004/0267686 A1 | 12/2004 | Chayes et al. | |
| 2005/0110679 A1 | 5/2005 | Brand | |

(Continued)

OTHER PUBLICATIONS

Cox et al., The Bayesian Image Retrieval System, PicHunter: Theory, Implementation, and Psychophysical Experiments, 2000, IEEE TIP, vol. 9, No. 1, pp. 1-18.*

(Continued)

*Primary Examiner* — David Vincent
(74) *Attorney, Agent, or Firm* — Steve M. Hoffberg; Ostrolenk Faber LLP

(57) ABSTRACT

Systems and Methods for multi-modal or multimedia image retrieval are provided. Automatic image annotation is achieved based on a probabilistic semantic model in which visual features and textual words are connected via a hidden layer comprising the semantic concepts to be discovered, to explicitly exploit the synergy between the two modalities. The association of visual features and textual words is determined in a Bayesian framework to provide confidence of the association. A hidden concept layer which connects the visual feature(s) and the words is discovered by fitting a generative model to the training image and annotation words. An Expectation-Maximization (EM) based iterative learning procedure determines the conditional probabilities of the visual features and the textual words given a hidden concept class. Based on the discovered hidden concept layer and the corresponding conditional probabilities, the image annotation and the text-to-image retrieval are performed using the Bayesian framework.

20 Claims, 5 Drawing Sheets

U.S. PATENT DOCUMENTS

| | | | |
|---|---|---|---|
| 2005/0141769 | A1 | 6/2005 | Ho et al. |
| 2005/0149230 | A1 | 7/2005 | Gupta et al. |
| 2005/0246321 | A1 | 11/2005 | Mahadevan et al. |
| 2005/0251532 | A1 | 11/2005 | Radhakrishnan et al. |
| 2005/0270285 | A1 | 12/2005 | Zhou et al. |
| 2005/0278352 | A1 | 12/2005 | Bradski |
| 2005/0285937 | A1 | 12/2005 | Porikli |
| 2005/0286774 | A1 | 12/2005 | Porikli |
| 2006/0015263 | A1 | 1/2006 | Stupp et al. |
| 2006/0045353 | A1 | 3/2006 | Brand |
| 2006/0050984 | A1 | 3/2006 | Tilton |
| 2006/0080059 | A1 | 4/2006 | Stupp et al. |
| 2006/0179021 | A1 | 8/2006 | Bradski |
| 2006/0200431 | A1 | 9/2006 | Dwork et al. |
| 2006/0235812 | A1 | 10/2006 | Rifkin et al. |
| 2006/0270918 | A1 | 11/2006 | Stupp et al. |
| 2007/0067281 | A1 | 3/2007 | Matveeva et al. |

OTHER PUBLICATIONS

Russell et al., Artificial Intelligence A Modern Approach Second edition, 2003, Pearson Education, Inc, pp. 1-11.*
Zhang et al., A Probabilistic Semantic Model for Image Annotation and Multi-Modal Image Retrieval, Oct. 2005, ICCV, pp. 846-851.*
Barnard et al., Learning the Semantics of Words and Pictures, 2001, Computer Vision, ICCV, pp. 1-8.*
Zhang et al., Hidden Semantic Concept Discovery in Region Based Image Retrieval, SUNY Binghampton, IEEE CVPR, Jun. 27, 2004, pp. 1-7.*
Datta et al., Content-Based Image Retrieval—Approaches and Trends of the New Age, 2005, ACM, pp. 1-10.*
Zhang et al., A Bayesian Framework for Automatic Concept Discovery in Image Collections, 2004, Proceedings of the 17th International Conference on Pattern Recognition (ICPR'04), pp. 1-4.*
James Allan et al, Topic Detection and Tracking Pilot Study Final Report, Proceedings of the DARPA Broadcast News Transcription and Understanding Workshop, Feb. 1998.
Kamal Nigam et al, Text Classification from Labeled and Unlabeled Documents using EM, Machine Learning, 1-34, Feb. 20, 1999.
Stan Sclaroff et al, ImageRover: A Content-Based Image Browser for the World Wide Web, Proc. IEEE Workshop on Content-Based Access of Image and Video Libraries, Jun. 1997.
La Cascia et al, Combining Textual and Visual Cues for Content-Based Image Retrieval on the World Wide Web, IEEF Workshop on Content-Based Access of Image and Video Libraries, Jun. 1998.
Jianping Fan et al, Concept-Oriented Indexing of Video Databases: Towards Semantic Sensitive Retrieval and Browsing, Department of Computer Science, University of North Carolina, Jul. 2004.
James Z. Wang et al, Evaluation Strategies for Automatic Linguistic Indexing of Pictures, The Pennsylvania State University, Sep. 2003.
V. Lavrenko et al, Statistical Models for Automatic Video Annotation and Retrieval, University of Massachusetts, Amherst, MA, May 2004.
James Z. Wang et al, Mining Digital Imagery Data for Automatic Linguistic Indexing of Pictures, Pennsylvania State University, University Park, PA, 2002.
Jia Li et al, Automatic Linguistic Indexing of Pictures by a Statistical Modeling Approach, IEEE Transactions on Pattern Analysis and Machine Intelligence, vol. 25, No. 9, Sep. 2003.
Thomas L. Griffith et al, A Probabilistic Approach to Semantic Representation, Stanford University, Stanford, CA, 2002.
Kevin Murphy et al, Using the Forest to See the Trees: A Graphical Model Relating Features, Objects and Scenes, MIT, Cambridge, MA, 2003.
Frank Dellaert, The Expectation Maximization Algorithm, Georgia Institute of Technology, Feb. 2002.
Kobus Barnard et al, Bayesian Models for Massive Multimedia Databases: a New Frontier, University of British Columbia, Vancouver, BC, Canada 2002.
Thijs Westerveld et al, Experimental Result Analysis for a Generative Probabilistic Image Retrieval Model, SIGIR '03, Toronto, Canada, Jul. 28-Aug. 1, 2003.
Jianbo Shi et al, Normalized Cuts and Image Segmentation, IEE Transactions on Pattern Analysis and Machine Intelligence, vol. 22, No. 8, Aug. 2000.
Thijs Westerveld et al, A Probabilistic Multimedia Retrieval Model and its Evaluation, University of Twente, The Netherlands, 2003.
Cha Zhang et al, Annotating Retrieval Database with Active Learning, Carnegie Mellon University, Pittsburgh, PA, 2003.
P. Duygulu et al, Object Recognition as Machine Translation: Learning a Lexicon for a Fixed Image Vocabulary, University of British Columbia, Vancouver, 2006.
Yixin Chen et al, A Region-Based Fuzzy Feature Matching Approach to Content-Based Image Retrieval, IEEE Transactions on Pattern Analysis and Machine Intelligence, vol. 24, No. 9, Sep. 2002.
Yap-Peng Tan et al, Rapid Estimation of Camera Motion from Compressed Video with Application to Video Annotation, IEEE Transactions on Circuits and systems for Video Technology, vol. 10, No. 1, Feb. 2000.
Nuno Vasconcelos et al, Towards Semantically Meaningful Feature Spaces for the Characterization of Video Content, MIT Media Laboratory, 1997.
Jane Hunter, Adding Multimedia to the Semantic Web—Building on MPEG-7 Ontology, University of Qld, Australia, 2011.
Rong Zhao et al, Narrowing the Semantic Gap—Improved Text-Based Web Document Retrieval Using Visual Features, Wayne State University, Detroit, Michigan, 2002.
Yasuhide Mori et al, Automatic Word Assignment to Images Based on Image Division and Vector Quantization, Real world Computing Partnership, Japan, 2000.
Rohini K. Srihari et al, Visual Semantics: Extracting Visual Information from Text Accompanying Pictures, CEDAR/Suny, Buffalo, New York, 1994.
Chad Carson et al, Blobworld: Image Segmentation Using Expectation-Maximization and its Application to Image Querying, 2002.
Chris Fraley et al, Model-Based Clustering, Discriminant Analysis and Density Estimation, University of Washington, Seattle, WA, Oct. 2000.
Mario A. T. Figueiredo et al, Unsupervised Learning of Finite Mixture Models, Institute of Telecommunications and the Department of Electrical and Computer Engineering, Lisboa, Portugal, 2002.
Nuno Vasconcelos et al, Bayesian Modeling of Video Editing and Structure-Semantic Features for Video Summarization and Browsing, MIT Media Laboratory, 1998.
James Z. Wang, Simplicity: Semantics-Sensitive Integrated Matching for Picture Libraries, Oct. 20, 1999.
Shih-Fu Chang et al, Semantic Visual Templates: Linking Visual Features to Semantics, Department of Electrical Engineering, New York, New York, 1998.
John R. Smith et al, VisualSEEk: A Fully automated Content-Based Image Query System, ACM Multimedia, Boston, MA, Nov. 20, 1996.
Christos Faloutsos et al, FastMap: A Fast Algorithm for Indexing, Data-Mining and Visualization of Traditional and Multimedia Datasets, National Science Foundation, 1995.
Yasuhide Mori et al, Image-to-Word Transformation Based on Dividing and Vector Quantizing Images with Words, Real World Computing Partnership, Japan, 1999.
Markus Koskela, Content-Based Image Retrieval with Self-Organizing Maps, Espoo, Finland Aug. 23, 1999.
Thomas Hofmann, Probabilistic Latent Semantic Analysis, EECS Department, Computer Science Division, University of California, Berkeley, CA, 1999.
Radford M. Neal et al, A View of the EM Algorithm That Justifies Incremental, Sparse, and Other Variants, Department of Statistics and Department of Computer Science, Toronto, Ontario, Canada, 1998.
Thomas Hofmann, Probabilistic Latent Semantic Indexing, International Computer Science Institute, Berkeley, CA, 2001.
Thomas Hofmann et al, Statistical Models for Co-occurrence Data, Massachusetts Institute of Technology, Feb. 1998.
Douglass R. Cutting et al, Scatter/Gather: A Cluster-Based Approach to Browsing Large Document Collections, SIGIR '92, Denmark, Jun. 1992.
Sharad Mehrotra, et al, Multimedia Analysis and Retrieval System, University of Illinois, Jun. 15, 1997.

Yong Rui et al, Relevance Feedback Techniques in Interactive Content-Based Image Retrieval, University of Illinois, Urbana, IL, 1997.

Kriengkrai Porkaew et al, Query Reformulation for Content Based Multimedia Retrieval in MARS, University of Illinois, Urbana, IL, Nov. 5, 1998.

Peter N. Belhumeur et al, Eigenfaces vs. Fisherfaces: Recognition Using Class Specific Linear Projection, Yale University, New Haven, CT, 1997.

Aditya Vailaya et al, A Bayesian Framework for Semantic Classification of Outdoor Vacation Images, Internet Systems & Applications Lab, Palo Alto, CA, 1999.

John R. Smith et al, Content-Based Transcoding of Images in the Internet, IBM, Hawthorne, New York, 1998.

Rohini K. Srihari, Computational Models for Integrating Linguistic and Visual Information: A Survey, CEDAR/SUNY, 1994.

Shi-Fu Chang et al, Next-Generation Content Representation, Creation and Searching for New Media Applications in Education, Columbia University, New York, New York, Dec. 7, 1997.

Yong Rui et al, Image Retrieval: Past, Present, and Future, University of Illinois, Urbana, IL, 1997.

Chad Carson et al, Blobworld: A System for Region-Based Image Indexing and Rerieval, EECS Department, Berkeley, CA, 1999.

Jon D. Mcauliffe et al, Nonparametric Empirical Bayes for the Dirichlet Process Mixture Model, Oct. 4, 2004.

Jia-Yu Pan et al, GCap: Graph-based Automatic Image Captioning, Carnegie Science Department, Pittsburgh, Pennsylvania, 2004.

Jun Jiano, the Application of Multimodal Data Mining: A Survey, Nanjing University, Nanjing, China, 1986.

Ruofei Zhang et al, Addressing CBIR Efficiency, Effectiveness, and Retrieval Subjectivity Simultaneously, SUNY, Binghamton, New York, 2003.

Pinar Duygulu et al, Associating Video Frames with Text, Carnegie Mellon University, Pittsburgh, Pennsylvania, 2003.

G. J. Mclachlan, et al, on Clustering by Mixture Models, University of Queensland, Brisbane, Australia, 1988.

G. J. Mclachlan, et al, Computing Issues for the EM Algorithm in Mixture Models, University of Queensland, Brisbane, Australia, 2008.

G. J. Mclachlan, et al, Modelling High-Dimensional Data by Mixtures of Factor Analyzers, University of Queensland, Brisbane, Australia, Mar. 2002.

Shu-Kay Ng et al, on Some Variants of the EM Algorithm for the Fitting of Finite Mixture Models, Austrian Journal of Statistics, vol. 32 (2003), Nos. 1 & 2, 143-161.

Shu Kay Ng et al, on Speeding Up the EM Algorithm in Pattern Recognition: A Comparison of Incremental and Multiresolution, KD-Tree-Based Approaches, DICTA 2002: Digital Image Computing Techniques and Applications, Jan. 21-22, 2002, Melbourne, Australia.

Shu Kay Ng et al, Robust Estimation in Gaussian Mixtures Using Multiresolution Kd-Trees, Department of Mathematics, University of Queensland, Brisbane, Australia, 2003.

Shu-Kay Ng et al, Normalized Gaussian Networks with Mixed Feature Data, Department of Mathematics, University of Queensland, Brisbane, Australia, 2005.

Shu-Kay Ng et al, Using the EM Algorithm to Train Neural Networks: Misconceptions and a New Algorithm for Multiclass Classification, Department of Mathematics, University of Queensland, Brisbane, Australia, Apr. 13, 2003.

S. K. Ng et al, On the Choice of the Number of Blocks with the Incremental EM Algorithm for the Fitting of Normal Mixtures, Department of Mathematics, University of Queensland, Brisbane, Australia, 2003.

S. K. Ng et al, An Em-based Semi-parametirc Mixture Model Approach to the Regression Analysis of Competing-Risks Data, Department of Mathematics, University of Queensland, Brisbane, Australia, 2003.

Shu-Kay Ng et al, Mixture Model-based Statistical Pattern Recognition of Clustered or Longitudinal Data, Department of Mathematics, University of Queensland, Brisbane, Australia, 2005.

S.K. Ng et al, Constrained Mixture Models in Competing Risks Problems, Department of Mathematics, University of Queensland, Brisbane, Australia, 1999.

Nicolas Loeff et al, Discriminating Image Senses by Clustering with Multimodal Features, COLING/ACL 2006, pp. 547-554, Sydney, Jul. 2006.

Pinar Duygulu et al, Translating Images to Words: A Novel Approach for Object Recognition, Department of Computer Engineering, Feb. 2003.

D. Peel et al, Robust Mixture Modelling Using the t distribution, Department of Mathematics, University of Queensland, Brisbane, Australia, 2000.

Nikhil V. Shirahatti et al, Evaluating Image Retrieval, University of Arizona, Tucson, Arizona, 2005.

Kobus Barnad et al, Modeling the Statistics of Image Features and Associated Text, University of California, Berkeley, California, 2002.

Kobus Barnard et al, Recognition as Translating Images into Text, University of Arizona, Tucson, Arizona, 2003.

Kobus Barnard et al, Modeling the Statistics of Image Features and Associated Text, University of California, Berkeley, California, 2002.

Kobus Barnard et al, A Method for Comparing Content Based Image Retrieval Methods, University of Arizona, Tucson, Arizona, 2003.

Kobus Barnard et al, Recognition as Translating Images into Text, University of California, Berkeley, California, 2003.

Jorma Rissanen, Stochastic Complexity and Its Applications, IBM Almaden Research Center, San Jose, California, 2003.

Kobus Barnard, et al, Cross Modal Disambiguation, University of Arizona, Tucson, Arizona, 2006.

Yee Whye Teh et al, Hierarchical Dirichlet Processes, National University of Singapore, Singapore, Dec. 15, 2005.

A. Hauptmann et al, Informedia at TRECVID 2003: Analyzing and Searching Broadcast News Video, ARDA, Nov. 9, 2003.

Deng Cai et al, VIPS: A Vision-based page Segmentation Algorithm, Technical report, Nov. 1, 2003.

Ruofei Zhang et al, A Unified Fuzzy Feature Indexing Scheme for Region Based Online Image Querying, SUNY, Binghamton, New York, 2003.

Giridharan Iyengar et al, Joint Visual-Text Modeling for Multimedia Retrieval, Nov. 24, 2004.

Keiji Yanai et al, Probabilistic Web Image Gathering, University of Electro-Communications, Tokyo, Japan, 2005.

Keiji Yanai et al, Evaluation Strategies for Image Understanding and Retrieval, University of Electro-Communications, Tokyo, Japan, Nov. 10-11, 2005.

Ruofei Zhang et al, A Probabilistic Semantic Model for Image Annotation and Multi-Modal Image Retrieval, SUNY, Binghamton, NY, 2005.

Bach, F. R., & Jordan, M. I. (2004). Learning spectral clustering. Advances in Neural Information Processing Systems 16.

Banerjee, A., Dhillon, I. S., Ghosh, J., Merugu, S., & Modha, D. S. (2004). A generalized maximum entropy approach to bregman co-clustering and matrix approximation. KDD (pp. 509-514).

D.D.Lee, & H.S.Seung (1999). Learning the parts of objects by non-negative matrix factorization. Nature, 401,788-791.

Dhillon, I. S. (2001). Co-clustering documents and words using bipartite spectral graph partitioning. KDD (pp. 269-274).

Dhillon, I. S., Mallela, S., & Modha, D. S. (2003). Information theoretic co-clustering. KDD'03 (pp. 89-98).

Ding, C., He, X., & Simon, H. (2005). On the equivalence of non-negative matrix factorization and spectral clustering. SDM'05.

Ding, C. H. Q., & He, X. (2004). Linearized cluster assignment via spectral ordering. ICML.

Ding, C. H. Q., He, X., Zha, H., Gu, M., & Simon, H. D. (2001). A min-max cut algorithm for graph partitioning and data clustering. Proceedings of ICDM 2001 (pp. 107-114).

Ei-Yaniv, R., & Souroujon, O. (2001). Iterative double clustering for unsupervised and semi-supervised learning. ECML (pp. 121-132).

Gao, B., Liu, T.-Y., Zheng, X., Cheng, Q.-S., & Ma,W.-Y. (2005). Consistent bipartite graph co-partitioning for star-structured high-order heterogeneous data co-clustering. KDD '05 (pp. 41-50).

Hofmann, T. (1999). Probabilistic latent semantic analysis. Proc. of Uncertainty in Artificial Intelligence, UAI'99. Stockholm.

Hofmann, T., & Puzicha, J. (1999). Latent class models for collaborative filtering. IJCAI'99. Stockholm.

H. Zha, C. Ding, M. X., & H. Simon (2001). Bi-partite graph partitioning and data clustering. ACM CIKM'01.

Li, T. (2005). A general model for clustering binary data. KDD'05.

Long, B., Zhang, Z. M., & Yu, P. S. (2005). Co-clustering by block value decomposition. KDD'05.

Ng, A., Jordan, M., & Weiss, Y. (2001). On spectral clustering: Analysis and an algorithm. Advances in Neural Information Processing Systems 14.

Shi, J., & Malik, J. (2000). Normalized cuts and image segmentation. IEEE Transactions on Pattern Analysis and Machine Intelligence, 22, 888-905.

Strehl, A., & Ghosh, J. (2002). Cluster ensembles—a knowledge reuse framework for combining partitionings. AAAI 2002 (pp. 93-98). AAAI/MIT Press.

Taskar, B., Segal, E., & Koller, D. (2001). Probabilistic classification and clustering in relational data. Proceeding of IJCAI-01.

Tishby, N., Pereira, F., & Bialek, W. (1999). The information bottleneck method. Proceedings of the 37-th Annual Allerton Conference on Communication, Control and Computing (pp. 368-377).

Wang, J., Zeng, H., Chen, Z., Lu, H., Tao, L., & Ma, W.-Y. (2003). Recom: reinforcement clustering of multi-type interrelated data objects. SIGIR '03 (pp. 274-281).

Zeng, H.-J., Chen, Z., & Ma, W.-Y. (2002). A unified framework for clustering heterogeneous web objects. WISE '02 (pp. 161-172).

Zha, H., Ding, C., Gu, M., He, X., & Simon, H. (2002). Spectral relaxation for k-means clustering. Advances in Neural Information Processing Systems, 14.

Kobus Barnard et al, Journal of Machine Learning Research 3 (2003) 1107-1135.

David Meir Blei, Probabilistic Models of Text and Images, University of California, Berkeley, California, 2004.

David M. Blei et al, Modeling Annotated Data, SIGIR '03, Jul. 28-Aug. 2003, Toronto, Canada.

David M. Blei et al, Variational Inference for Dirichlet Process Mixtures, Bayesian Analysis, No. 1, pp. 121-144, 2006.

David M. Blei et al, Dynamic Topic Models, Computer Science Department, Princeton, New Jersey 2006.

David M. Blei et al, A Correlated topic Model of Science, The Annuals of Applied Statistics, vol. 1, No. 1, 17-35, 2007.

David M. Blei et al, Topic Segmentation with an Aspect Hidden Markov Model, SIGIR '01, Sep. 9-12, 2001, New Orleans, Louisiana.

David Blei et al, Latent Dirichlet Allocation, Journal of Machine Learning Research 3 (2003) 993-1022.

Pinar Duygulu et al, What's News, What's Not? Associating News Videos with Words, Department of Computer Engineering, Ankara, Turkey, 2004.

Paola Virga et al, Systematic Evaluation of Machine Translation Methods for Image and Video Annotation, Department of Computer Science, Baltimore, Maryland, 2005.

Nazh Ikizler et al, Person Search Made Easy, Department of Computer Engineering, Ankara, Turkey. 2005.

Muhammet Bastan et al, Recognizing Objects and Scenes in News Videos, 2006.

Jia-Yu Pan, Advanced Tools for Video and Multimedia Mining, CMU, May 12, 2006.

Igor V. Cadez et al, Maximum Likelihood Estimation of Mixture Densities for Binned and Truncated Multivariate Data, Machine Learning, 47, 7-34, The Netherlands, 2002.

Kobus Barnard et al, Clustering Art, University of California, Berkeley, California, 2001.

Barnard et al, The Effects of Segmentation and Feature Choice in a Translation Model of Object Recognition, Department of Computing Science, University of Arizona, 2003.

Ozkan et al, A Graph Based Approach for Naming Faces in News Photos, Department of Computer Engineering, Ankara, Turkey, 2006.

Kobus Barnard et al, The Effects of Segmentation and Feature Choice in a Translation Model of Object Recognition, Department of Computing Science, University of Arizona, 2003.

Kobus Barnard, Reducing Correspondence Ambiguity in Loosely Labeled Training Data, University of Arizona, 2007.

Ruofei Zhang et al, Hidden Semantic Concept Discovery in Region Based Image Retrieval, Department of Computer Science, Binghamton, New York, 2004.

Kobus Barnard, Exploiting Text and Image Feature Co-occurrence Statistics in Large Datasets, Computer Science Department, University of Arizona, 2004.

Ritendra Datta, et al, Image Retrieval: Ideas, Influences, and Trends of the New Age, ACM Computing Surveys, vol. 40, No. 2, Article 5, Apr. 2008.

Ritendra Datta et al, Toward Bridging the Annotation-Retrieval Gap in Image Search by a Generative Modeling Approach, MM '06, Oct. 23-27, 2006, Santa Barbara, California.

Pinar Duygulu et al, Linking Visual and Textual Data on Video, Carnegie Mellon University, Pittsburgh, PA, 2003.

P. Duygulu et al, Object Recognition as Machine Translation: Learning a Lexicon for a Fixed Image Vocabulary, University of British Columbia, Vancouver, CA, 2006.

Peter Carbonetto et al, A Statistical Model for General Contextual Object Recognition, University of Arizona, Tucson, Arizona, 2004.

Ruofei Zhang et al, Stretching Bayesian Learning in the Relevance Feedback of Image Rerieval, State University of New York, Binghamton, New York, 2004.

Thomas L. Griffiths et al, Integrating Topics and Syntax, Massachusetts Institute of Technology, Cambridge, MA, 2005.

Ruofei Zhang et al, A Probabilistic Semantic Model for Image Annotation and Multi-Modal Image Retrieval, SUNY, Binghamton, New York, 2005.

Kobus Barnard et al, Learning the Semantics of Words and Pictures, University of California, Berkeley, CA, 2001.

Zhongfei Zhang et al, Exploiting the Synergy Between Different Modalities in Multimodal Information Retrieval, SUNY, Binghamton, New York, 2004.

Jia-Yu Pan et al, Automatic Image Captioning, Bilkent University, Ankara, Turkey, 2004.

Ruofei Zhang et al, Image Database Classification Based on Concept Vector Model, SUNY, Binghamton, NY, 2005.

Ruofei Zhang et al, Semantic Repository Modeling in Image Database, SUNY, Binghamton, NY, 2004.

Hilal Zitouni et al, Re-ranking of Image Search Results Using a Graph Algorithm, Bilkent University, Apr. 16, 2008.

Ruofei Zhang et al, A Clustering Based Approach to Efficient Image Retrieval, SUNY, Binghamton, NY, 2002.

Zhi-Hua Zhou et al, Exploiting Image Contents in Web Search, Nanjing University, Nanjing, China, 2007.

Pinar Duygulu et al, Comparison of Feature Sets Using Multimedia Translation, Carnegie Mellon University, Pittsburgh, PA, 2003.

Kobus Barnard et al, Color and Color Constancy in a Translation Model for Object Recognition, University of Arizona, Tucson, Arizona, 2003.

Kobus Barnard et al, Mutual Information of Words and Pictures, Department of Computer Science, Tucson, Arizona, 2006.

Kobus Barnard et al, Exploiting Image Semantics for Picture Libraries, University of California, Berkeley, California, 2001.

Kobus Barnard et al, Matching Words and Pictures, University of Arizona, Tucson, Arizona, 2003.

Inderjit S. Dhillon et al, A Divisive Information-Theoretic Feature Clustering Algorithm for Text Classification, University of Texas, Austin, Texas 2003.

Ruofei Zhang et al, A Data Mining Approach to Modeling Relationships Among Categories in Image Collection, SUNY at Binghamton, Binghamton, New York 2004.

Jia-Yu Pan et al, Automatic Multimedia Cross-modal Correlation Discovery, Carnegie Mellon University, Pittsburgh, Pennsylvania 2004.

Jia-Yu Pan et al, Cross-Modal Correlation Mining Using Graph Algorithms, Carnegie Mellon University, Pittsburgh, Pennsylvania, 2004.

Wei Li et al, Nonparametric Bayes Pachinko Allocation, University of Massachusetts, Amherst, Massachusetts, 2007.

Kobus Barnard et al, Word Sense Disambiguation with Pictures, University of Arizona, Tucson, Arizona, 2005.

GJ Mclachlan, On the EM Algorithm for Overdispersed Count Data, University of Queensland, Queensland, 1997.

GJ Mclachlan, Mixture Modelling for Cluster Analysis, University of Queensland, Queensland, 2004.

Thomas Hofmann et al, Unsupervised Texture Segmentation in a Deterministic Annealing Framework, Massachusetts Institute of Technology, Cambridge, MA, May 14, 1998.

Thomas Hofmann et al, Unsupervised Learning from Dyadic Data, International Computer Science Institute, Berkley, CA, Dec. 1998.

Rohini K. Srihari et al, Use of Collateral Text in Image Interpretation, State University of New York, Buffalo, New York, 1994.

G. L. Mclachlan et al, Clustering Via Normal Mixture Models, Department of Mathematics, Queensland, Australia, 1999.

Nuno Vasconcelos et al, A Bayesian Framework for Semantic Content Characterization, MIT Media Laboratory, Cambridge, MA, 1998.

Jorma Rissanen, Stochastic Complexity and Its Application, IBM, San Jose, CA, 1987.

Susan T. Dumais, Latent Semantic Indexing (LSI) and TREC-2, 1995.

Guoliang Cao, Bayesian Nonparametric Mixture Modeling, Institute of Statistics and Decision Sciences, Duke University, 1993.

G. J. Mclachlan et al, An Algorithm for Unsupervised Learning via Normal Mixture Models, Department of Mathematics, Queensland, Australia, 1996.

Louis Weitzman et al, Automatic Presentation of Multimedia Documents Using Relational Grammars, MIT, Cambridge, MA, 1994.

Mark Craven et al, Learning to Extract Symbolic Knowledge from the World Wide Web, Sep. 1, 1998.

Fabio Gagliardi Cozman et at, Semi-Supervised Learning of Mixture Models, Cidade University, Sao Paulo, SP, Brazil, 2003.

Kai Yu et a, Dirichlet Enhanced Latent Semantic Analysis, Munich, Germany, 2005.

Vibhu O. Mittal et al, Describing Complex Charts in Natural Language: A Caption Generation System, University of Pittsburgh, Pittsburgh, PA, 1998.

J. Shotton et al, TextonBoost: Joint Appearance, Shape and Context Modeling for Multi-Class Object Recognition and Segmentation, Department of Engineering, University of Cambridge, 2006.

Cees G.M. Snoek et al, The Challenge Problem for Automated Detection of 101 Semantic Concepts in Multimedia, ISLA, Informatics Institute, University of Amsterdam, The Netherlands, 2006.

Alexei Yavlinsky et al, Automated Image Annotation Using Global Features and Robust Nonparametric Density Estimation, Imperial College, London, UK, 2005.

G. Iyengar et al, Joint Visual-Text Modeling for Automatic Retrieval of Multimedia Documents, MM '05, Nov. 6-12, 2005.

Andrew McCallum et al, A Comparison of Event Models for Naive Bayes Text Classification, Pittsburgh, PA, 1998.

Brigitte Bigi et al, Vocabulary and Language Model Adaptation using Information Retrieval, ICSI, Berkeley, CA, 2004.

V. Lavrenko et al, A Model for Learning the Semantics of Pictures, University of Massachusetts, 2003.

Kobus Barnard et al, Object Recognition as Machine Translation—Part 2: Exploiting Image Database Clustering Models, University of British Columbia, Vancouver, BC, Canada, 2002.

Jane Hunter, MetaNet—A Metadata Term Thesaurus to Enable Semantic Interoperability Between Metadata Domains, Queensland, Australia, 2001.

Philippe Aigrain et al, Content-Based Representation and Retrieval of Visual Media: A State-of-the-Art Review, Universite Paul Sabatier, France, 1996.

Simon Tong et al, Support Vector Machine Active Learning for Image Retrieval, Department of Computer Science, Sanford, CA, 2001.

Yong Rui et al, Image Retrieval: Current Techniques, Promising Directions, and Open Issues, University of Illinois at Urbana-Champaign, Urbana, Illinois, 1999.

Ching-Yung Lin et al, Video Collaborative Annotation Forum: Establishing Ground-Truth Labels on Large Multimedia Datasets, IBM, Hawthorne, NY, 2003.

Scott Deerwester et al, Indexing by Latent Semantic Analysis, Journal of American Society for Information Science, 41(6):391-407, 1990.

Ingemar J. Cox et al, The Bayesian Image Retrieval System, PicHunter: Theory, Implementation, and Psychophysical Experiments, IEEE, 2000.

David M. Blei et al, Latent Dirichlet Allocation, Journal of Machine Learning Research 3 (2003) 993-1022.

Kobus Barnard et al, Matching Words and Pictures, Journal of Machine Learning Research 3 (2003) 1107-1135.

Avrim Blum et al, Combining Labeled and Unlabeled Data with Co-Training, School of Computer Science, Pittsburgh, PA, 1998.

Edward Chang et al, CBSA: Content-Based Soft Annotation for Multimodal Image Retrieval Using Bayes Point Machines, University of California, Santa Barbara, CA, 2003.

Thorsten Joachims, Text Categorization with Support Vector Machines: Learning with Many Relevant Features, Universitat, Dortmund, Germany, 1998.

Michael W. Berry et al, Matrices, Vector Spaces, and Information Retrieval, Department of Computer Science, Knoxville, TX, 1999.

Gustavo Carneiro et al, Formulating Semantic Image Annotation as a Supervised Learning Problem, University of British Columbia, Vancouver, BC, Canada, 2005.

David M. Blei et al, Variational Methods for the Dirichlet Process, Computer Science Division, Berkeley, CA 2006.

David Yarowsky, Unsupervised Word Sense Disambiguation Rivaling Supervised Methods, University of Pennsylvania, Philadelphia, PA, 1995.

J. R. Quinlan, Learning Logical Definitions from Relations, Machine Learning, 5, 239-266 (1990), The Netherlands.

Yves Rosseel, Mixture Models of Categorization, Ghent University, 2002.

Anil K. Jain et al, Statistical Pattern Recognition: A Review, IEEE, 2000.

Wai Lam et al, Learning Bayesian Belief Networks an Approach Based on the MDL Principle, University of Waterloo, Waterloo, Ontario, Canada, 1994.

Kevin Patrick Murphy, Dynamic Bayesian Networks: Representation, Inference and Learning, Cambridge University, 1992.

Thomas Hofmann, Unsupervised Learning by Probabilistic Latent Semantic Analysis, Machine Learning, 42, 177-196, 2001, The Netherlands.

A. P. Dempster et al, Maximum Likelihood from Incomplete Data Via the EM Algorithm, Journal of the Royal Statistical Society, vol. 39, No. 1 (1977), pp. 1-38.

Arnold W. M. Smeulders et al, Content-Based Image Retrieval at the End of the Early Years, IEEE Transactions on Pattern Analysis and Machine Intelligence, vol. 22, No. 12, Dec. 2000.

Michael I. Jordan et al, Hierarchical Mixtures of Experts and the EM Algorithm, Proceedings of 1993 International Joint Conference on Neural Networks, 1994.

Aditya Vailaya et al, Image Classification for Content-Based Indexing, IEEE Transactions on Image Processing, vol. 10, No. 1, Jan. 2001.

G. Iyengar et al, Joint Visual-text Modeling for Automatic Retrieval of Multimedia Documents, IBM, 2005.

Kobus Barnard et al, Word Sense Disambiguation with Pictures, Computer Science Department, University of Arizona, 2005.

* cited by examiner

{people(6), mountain(6), sky(5), outdoor(7), rocky(4), snow-capped(2)}

| System | MBRM | Present Invention |
|---|---|---|
|  | Animal water wolf house tiger | Wolf winter wild animal stone |
|  | Male-face hair people bear sky | Male-face hair people man monologue |
|  | Bird grass leopard sail cuckoo | Bird cuckoo yellow sand sky |
|  | Flower red tree meadow outdoor | Flower red azalea leaf landscape |
|  | Desert beach mummy building church | Pyramid Egypt desert mummy beach |

SYSTEM AND METHOD FOR IMAGE ANNOTATION AND MULTI-MODAL IMAGE RETRIEVAL USING PROBABILISTIC SEMANTIC MODELS COMPRISING AT LEAST ONE JOINT PROBABILITY DISTRIBUTION

CROSS REFERENCE TO RELATED APPLICATIONS

The present application is a Continuation of U.S. patent application Ser. No. 11/626,835, filed Jan. 24, 2007, issued Oct. 12, 2010 as U.S. Pat. No. 7,814,040, which is a non-provisional application claiming benefit of priority from U.S. Provisional Patent Application Ser. No. 60/763,848, filed Jan. 31, 2006, each of which is expressly incorporated herein in their entirety.

BACKGROUND OF THE INVENTION

Efficient access to multimedia database content requires the ability to search and organize multimedia information. In one form of traditional image retrieval, users have to provide examples of images that they are looking for. Similar images are found based on the match of image features. This retrieval paradigm is called Content-Based Image Retrieval (CBIR). In another type of retrieval system, images are associated with a description or metadata which is used as a surrogate for the image content.

It is noted that audio retrieval systems may also employ pattern recognition and content extraction. Typically, the content extraction operates on a direct semantic level, e.g., speech recognition, while source modeling and musical structure extraction may also be employed. Rarely, however, are implicit semantic concepts derived independently of the express semantic structures expressly presented in the audio sample.

Even though there have been many studies on CBIR, empirical studies have shown that using image features solely to find similar images is usually insufficient due to the notorious gap between low-level features and high-level semantic concepts (called semantic gap) [21]. In order to reduce this gap, region based features (describing object level features), instead of raw features of whole image, to represent the visual content of an image is proposed [5, 22, 7].

On the other hand, it is well-observed that often imagery does not exist in isolation; instead, typically there is rich collateral information co-existing with image data in many applications. Examples include the Web, many domain archived image databases (in which there are annotations to images), and even consumer photo collections. In order to further reduce the semantic gap, recently multi-modal approaches to image retrieval are proposed in the literature [25] to explicitly exploit the redundancy co-existing in the collateral information to the images. In addition to the improved retrieval accuracy, another benefit for the multimodal approaches is the added querying modalities. Users can query an image database either by image, or by a collateral information modality (e.g., text), or by any combination.

In addition to static image retrieval, proposals and systems have been developed to handle object identification, extraction, characterization, and segment retrieval in video programs and samples. In general, these systems directly extend the static image and audio techniques, although they may gain benefit of synchronization and association of audio and video data (and possibly closed caption text, if available). Likewise, analysis of temporal changes allows extraction of objects, analysis of object degrees of freedom, and motion planes within the signal. See, U.S. Pat. Nos. 6,850,252; 6,640,145; 6,418,424; 6,400,996; 6,081,750; 5,920,477; 5,903,454; 5,901,246; 5,875,108; 5,867,386; and 5,774,357, expressly incorporated herein by reference. Automated annotation of images and video content may be used in conjunction with MPEG-7 technologies.

Another use of object identification techniques is to permit efficient compression and/or model-based representation of objects within an image or video stream. Thus, especially in information loss-tolerant compression schemes, an image may be compressed in a vector quantized scheme by representing an object with a symbol (e.g., a word). The symbol, of course, may include a variety of parameters, for example describing scaling, translation, distortion, orientation, conformation, etc, as well as providing an error vector to establish deviance of the original image from the symbol (or model) representation.

A number of approaches have been proposed in the literature on automatic image annotation [1, 10, 11, 17]. Different models and machine learning techniques are developed to learn the correlation between image features and textual words from the examples of annotated images and then apply the learned correlation to predict words for unseen images. The co-occurrence model [19] collects the co-occurrence counts between words and image features and uses them to predict annotated words for images. Barnard and Duygulu et al [1, 10] improved the co-occurrence model by utilizing machine translation models. The models are correspondence extensions to Hofmann's hierarchical clustering aspect model [14, 15, 13], which incorporate multimodality information. The models consider image annotation as a process of translation from "visual language" to text and collect the co-occurrence information by the estimation of the translation probabilities. The correspondence between blobs and words are learned by using statistical translation models. As noted by the authors [1], the performance of the models is strongly affected by the quality of image segmentation. More sophisticated graphical models, such as Latent Dirichlet Allocator (LDA) [3] and correspondence LDA, have also been applied to the image annotation problem recently [2]. Another way to address automatic image annotation is to apply classification approaches. The classification approaches treat each annotated word (or each semantic category) as an independent class and create a different image classification model for every word (or category).

One representative work of these approaches is automatic linguistic indexing of pictures (ALIPS) [17]. In ALIPS, the training image set is assumed well classified and each category is modeled by using 2D multi-resolution hidden Markov models. The image annotation is based on nearest-neighbor classification and word occurrence counting, while the correspondence between the visual content and the annotation words is not exploited. In addition, the assumption made in ALIPS that the annotation words are semantically exclusive may not be necessarily valid in nature.

Recently, relevance language models [11] have been successfully applied to automatic image annotation. The essential idea is to first find annotated images that are similar to a test image and then use the words shared by the annotations of the similar images to annotate the test image.

One model in this category is Multiple-Bernoulli Relevance Model (MBRM) [11], which is based on the Continuous space Relevance Model (CRM) [16]. In MBRM, the word probabilities are estimated using a multiple Bernoulli model and the image block feature probabilities using a nonparametric kernel density estimate. The reported experiment shows that MBRM model outperforms the previous CRM model, which assumes that annotation words for any given image follow a multinomial distribution and applies image segmentation to obtain blobs for annotation.

It has been noted that in many cases both images and word-based documents are interesting to users' querying needs, such as in the Web search environment. In these scenarios, multi-modal image retrieval, i.e., leveraging the collected textual information to improve image retrieval and to enhance users' querying modalities, is proven to be very promising. Some studies have been reported on this problem.

Chang et al [6] applied a Bayes point machine to associate words and images to support multi-modal image retrieval. In [26], latent semantic indexing is used together with both textual and visual features to extract the underlying semantic structure of Web documents. Improvement of the retrieval performance is reported attributed to the synergy of both modalities. Recently, approaches using multi-modal information for Web image retrieval are emerging. In [23], an iterative similarity propagation approach is proposed to explore the inter-relationships between Web images and their textual annotations for image retrieval. The mutual reinforcement of similarities between different modalities is exploited, which boosts the Web image retrieval performance.

Appendix A provides a list of references relating to content-based image retrieval [CBIR], and latent semantic indexing, each of which is expressly incorporated herein by reference.

SUMMARY OF THE INVENTION

The present invention provides systems and methods for probabilistic semantic modeling of image information and the corresponding learning procedure to address the problem of automatic image annotation and its application to multi-modal image retrieval.

The probabilistic semantic model preferably exploits the synergy between the different modalities of the imagery and the collateral information.

While the preferred embodiment focuses on a specific collateral modality—text, it should be apparent that any other collateral modalities, such as audio, time-sequences, hyperlink and reverse-hyperlink analysis, etc. The model may thus be generalized to incorporating other collateral modalities.

Consequently, the synergy here is explicitly represented as a hidden layer between the image and the text modalities. This hidden layer constitutes the concepts to be discovered through a probabilistic framework such that the confidence of the association can be provided. While a preferred embodiment employs unconstrained concepts, it should be apparent that taxonomies, hierarchies, vocabularies, and other intrinsic or extrinsic conceptual frameworks may be provided, either to expressly limit the concepts within the hidden layer, or as an adjunct to the unconstrained concepts. It should also be apparent that, while a single hidden layer is sufficient for the preferred embodiment, multiple hidden layers and/or partial additional layers may be implemented in known manner.

An Expectation-Maximization (EM) based iterative learning procedure is preferably employed to determine the conditional probabilities of the visual features and the words given a hidden concept class. Based on the discovered hidden concept layer and the corresponding conditional probabilities, the image-to-text retrieval and text-to-image retrieval are performed in a Bayesian framework.

While the preferred embodiment relates images to words, it is understood that the input and output of the system are not limited thereby, and the methods and systems described herein may be used to relate any two modalities linked through a hidden concept layer. Likewise, the system is not limited to simply outputting a word set associated with an image, or an image set associated with a word, but rather may be employed within a larger and more complex system to provide automated data processing and/or to implement a control system.

In recent CBIR literature, Corel data have been extensively used to evaluate the retrieval performance [1, 10, 11, 17]. It has been argued [24] that the Corel data are much easier to annotate and retrieve due to its relatively small number of concepts and relatively small variations of visual contents. In addition, the relatively small number (1000 to 5000) of training images and test images typically used in the literature further makes the problem easier and the evaluation less convictive.

In order to truly capture the difficulties in real scenarios such as Web image retrieval and to demonstrate the robustness and promise of the inventive model and framework in these challenging applications, a prototype system is evaluated on a collection of 17,000 images with the automatically extracted textual annotation from various crawled Web pages. The model and framework according to the present invention work well in this scale, even considering the very noisy image data set, and substantially outperforms the state-of-the-art peer system MBRM [11].

To achieve the automatic image annotation as well as multimodal image retrieval, a probabilistic semantic model is provided for the training image and the associated textual word annotation dataset. The preferred probabilistic semantic model is developed by the EM technique to determine the hidden layer connecting image features and textual words, which constitutes the semantic concepts to be discovered to explicitly exploit the synergy between imagery and text.

It is therefore an object of the present invention to provide a probabilistic semantic model in which the visual features and textual words are connected via a hidden layer to constitute the concepts to be discovered to explicitly exploit the synergy between the two modalities. An EM based learning procedure is developed to fit the model to the two modalities.

It is a further object of the invention to provide a system and method in which the association of visual features and textual words is determined in a Bayesian framework such that the confidence of the association can be provided.

BRIEF DESCRIPTION OF THE FIGURES

The invention will now be explained with reference to the figures, in which.

DETAILED DESCRIPTION OF THE INVENTION

Probabilistic Annotated Image Model

As employed herein, $f_i$, $i \in [1, N]$ denotes the visual feature vector of images in the training database, where N is the size of the database. $w^j$, $j \in [1,M]$ denotes the distinct textual words in the training annotation word set, where M is the size of annotation vocabulary in the training database.

In the probabilistic model, we assume the visual features of images in the database, $f_i[f_i^1, f_i^2, \ldots, f_i^L]$, $i \in [1,N]$ are known i.i.d. samples from an unknown distribution.

The dimension of the visual feature is L. We also assume that the specific visual feature annotation word pairs $(f_i, w^j)$, $i \in [1,N]$, $j \in [1,M]$ are known i.i.d. samples from an unknown distribution. Furthermore we assume that these samples are associated with an unobserved semantic concept variable $z \in Z = \{z_1, \ldots z_k\}$. Each observation of one visual feature $f \in F = \{f_1, f_2, \ldots, f_N\}$ belongs to one or more concept classes $z_k$ and each observation of one word $w \in V = \{w^1, w^2, \ldots, w^M\}$ in one image $f_i$ belongs to one concept class. To simplify the model, we have two more assumptions. First, the observation pairs $(f_i, w^j)$ are generated independently. Second, the pairs of random variables $(f_i, w^j)$ are conditionally independent given the respective hidden concept $z_k$, $$P(f_i, w^j | z_k) = P_\Im(f_i | z_k) P_V(w^j | z_k) \quad (1)$$

The visual feature and word distribution is treated as a randomized data generation process described as follows:
- choose a concept with probability $P(z_k)$;
- select a visual feature $f_i \in F$ with probability $P_\Im(f_i | z_k)$; and
- select a textual word $w^j \in V$ with probability $P_V(w^j | z_k)$.

Figure 1:
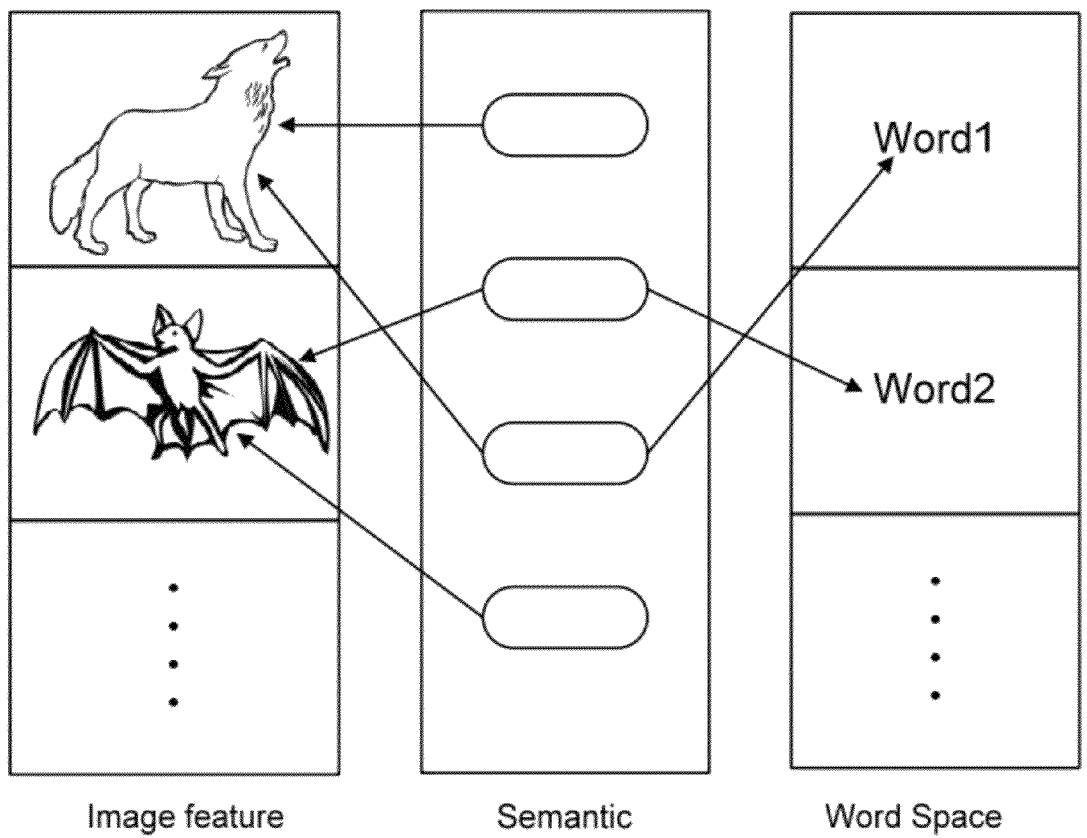
FIG. 1 shows a graphic representation of the model for the randomized data generation for exploiting the synergy between imagery and text.

As a result one obtains an observed pair $(f_i, w^j)$, while the concept variable $z_k$ is discarded. The graphic representation of this model is depicted in FIG. 1.

Translating this process into a joint probability model results in the expression $$P(f_i, w^j) = P(w^j) P(f_i | w^j) \quad (2)$$

$$= P(w^j) \sum_{k=1}^{K} P_\Im(f_i | z_k) P(z_k | w^j)$$

Inverting the conditional probability $P(z_k | w^j)$ in (2) with the application of the Bayes' rule results in $$P(f_i, w^j) = \sum_{k=1}^{K} P_z(z_k) P_\Im(f_i | z_k) P_V(w^j | z_k) \quad (3)$$

The mixture of Gaussian [9] is assumed for the feature concept conditional probability $P_\Im(\cdot | Z)$. In other words, the visual features are generated from K Gaussian distributions, each one corresponding a $z_k$. For a specific semantic concept variable $z_k$, the conditional probability density function (pdf) of visual feature $f_i$ is $$P_\Im(f_i | z_k) = \frac{1}{2\pi^{L/2} |\Sigma_k|^{1/2}} e^{-\frac{1}{2}(f_i - \mu_k)^T \Sigma_k^{-1}(f_i - \mu_k)} \quad (4)$$

where $\Sigma_k$ and $\mu_k$ are the covariance matrix and mean of visual features belonging to $z_k$, respectively. The word concept conditional probabilities $P_V(\cdot | Z)$, i.e., $P_V(w^j | z_k)$ for $k \in [1, K]$, are estimated through fitting the probabilistic model to the training set.

Following the maximum likelihood principle, one determines $P_\Im(f_i | z_k)$ by maximization of the log-likelihood function $$\log \prod_{i=1}^{N} P_\Im(f_i | Z)^{u_i} = \sum_{i=1}^{N} u_i \log \left( \sum_{k=1}^{K} P_z(z_k) P_\Im(f_i | z_k) \right) \quad (5)$$

where $u_i$ is the number of annotation words for image $f_i$. Similarly, $P_z(z_k)$ and $P_V(w^j | z_k)$ can be determined by maximization of the log-likelihood function $$\mathcal{L} = \log P(F, V) = \sum_{i=1}^{N} \sum_{j=1}^{M} n(w_i^j) \log P(f_i, w^j) \quad (6)$$

where $n(w_i^j)$ denotes the weight of annotation word $w^j$, i.e., occurrence frequency, for image $f_i$.

EM-Based Procedure for Model Fitting

From (5), (6) and (2) we derive that the model is a statistical mixture model [18], which can be resolved by applying the EM technique [8]. The EM alternates in two steps: (i) an expectation (E) step where the posterior probabilities are computed for the hidden variable $z_k$ based on the current estimates of the parameters; and (ii) an maximization (M) step, where parameters are updated to maximize the expectation of the complete-data likelihood $\log P(F,V,Z)$ given the posterior probabilities computed in the previous E-step.

Thus the probabilities can be iteratively determined by fitting the model to the training image database and the associated annotations.

Applying Bayes' rule to (3), we determine the posterior probability for $z_k$ under $f_1$ and $$(f_i, w^j): p(z_k | f_i) = \frac{P_z(z_k) P_\Im(f_i | z_k)}{\sum_{t=1}^{K} P_z(z_t) P_\Im(f_i | z_t) P_V(w^j | z_t)} \quad (7)$$

$$p(z_k | f_i, w^j) = \frac{P_z(z_k) P_z(f_i | z_k) P_V(w^j | z_k)}{\sum_{t=1}^{K} P_z(z_t) P_\Im(f_i | z_t) P_V(w^j | z_t)} \quad (8)$$

The expectation of the complete-data likelihood $\log P(F,V,Z)$ for the estimated $\log P(F|V,Z)$ derived from (8) is $$\sum_{(i,j)=1}^{K} \sum_{i=1}^{N} \sum_{j=1}^{M} n(w_i^j) \quad (9)$$

$$\log[P_z(z_{i,j}) P_\Im(f_i | z_{i,j}) P_V(w^j | z_{i,j})] P(Z | F, V)$$

where $$P(Z \mid F, V) = \prod_{s=1}^{N} \prod_{t=1}^{M} P(z_{s,t} \mid f_s, w^t) \quad (9)$$

In (9) the notation $z_{i,j}$ is the concept variable that associates with the feature-word pair $(f_i, w^j)$. In other words, $(f_i, w^j)$ belongs to concept $z_t$ where $t=(i,j)$.

Similarly, the expectation of the likelihood log P (F,Z) for the estimated P(Z|F) derived from (7) is $$\sum_{k=1}^{K} \sum_{i=1}^{N} \log(P_z(z_k) p_{\mathfrak{F}}(f_i \mid z_k)) p(z_k \mid f_i) \quad (10)$$

Maximizing (9) and (10) with Lagrange multipliers to $P_z(z_l)$, $p_{\mathfrak{F}}(f_u|z_l)$ and $P_V(w^v|z_l)$ respectively, under the following normalization constraints $$\sum_{k=1}^{K} P_z(z_k) = 1, \quad \sum_{k=1}^{K} P(z_k \mid f_i, w^j) = 1 \quad (11)$$

for any $f_i$, $w^j$ and $z_l$, the parameters are determined as $$\mu_k = \frac{\sum_{i=1}^{N} u_i f_i p(z_k \mid f_i)}{\sum_{s=1}^{N} u_s p(z_k \mid f_s)} \quad (12)$$

$$\sum_k = \frac{\sum_{i=1}^{N} u_i p(z_k \mid f_i)(f_i - \mu_k)(f_i - \mu_k)^T}{\sum_{s=1}^{N} u_s p(z_k \mid f_s)} \quad (13)$$

$$P_z(z_k) = \frac{\sum_{j=1}^{M} \sum_{i=1}^{N} u(w_i^j) P(z_k \mid f_i, w^j)}{\sum_{j=1}^{M} \sum_{i=1}^{N} n(w_i^j)} \quad (14)$$

$$P_V(w^j \mid z_k) = \frac{\sum_{i=1}^{N} n(w_i^j) P(z_k \mid f_i, w^j)}{\sum_{u=1}^{M} \sum_{V=1}^{N} n(w_V^u) P(z_k \mid f_V, w^u)} \quad (15)$$

Alternating (7) and (8) with (12)-(15) defines a convergent procedure to a local maximum of the expectation in (9) and (10).

Estimating the Number of Concepts

The number of concepts, K, must be determined in advance for the EM model fitting. Ideally, we intend to select the value of K that best agrees to the number of semantic classes in the training set. One readily available notion of the fitting goodness is the log-likelihood. Given this indicator, we can apply the Minimum Description Length (MDL) principle [20] to select among values of K. This can be done as follows [20]: choose K to maximize $$\log(P(F, V)) - \frac{m_K}{2} \log(MN) \quad (16)$$

where the first term is expressed in (6) and $m_k$ is the number of free parameters needed for a model with K mixture components. In our probabilistic model, we have $$m_K = (K-1) + K(M-1) + K(N-1) + L^2 = K(M+N-1) + L^2 - 1$$

As a consequence of this principle, when models with different values of K fit the data equally well, the simpler model is selected. In our experimental database, K is determined through maximizing (16).

Model Based Image Annotation and Multi-Modal Image Retrieval

After the EM-based iterative procedure converges, the model fitted to the training set is obtained. The image annotation and multi-modal image retrieval are conducted in a Bayesian framework with the determined $P_z(z_k)$, $p_{\mathfrak{F}}(f_i|z_k)$, and $P_V(w^j|z_k)$.

Image Annotation and Image-to-Text Retrieval

The objective of image annotation is to return words which best reflect the semantics of the visual content of images.

According to one embodiment of the present invention, a joint distribution is used to model the probability of an event that a word w' belonging to semantic concept $z_k$ is an annotation word of image $f_i$. Observing (1), the joint probability is $$P(w^j, z_k, f_i) = P_z(Z_k) p_{\mathfrak{F}}(f_i | z_k) P_V(w^j | z_k) \quad (17)$$

Through applying Bayes law and the integration over $P_z(z_k)$, we obtain the following expression:

$$P(w^j \mid f_i) = \int P_V(w^j \mid z) p(z \mid f_i) dz \quad (18)$$

$$= \int P_V(w^j \mid z) \frac{p_{\mathfrak{F}}(f_i \mid z) P(z)}{p(f_i)} dz$$

$$= E_z \left\{ \frac{P_V(w^j \mid z) p_{\mathfrak{F}}(f_i \mid z)}{p(f_i)} \right\}$$

where $$p(f_i) = \int p_{\mathfrak{F}}(f_i | z) P_z(z) dz = E_z \{ p_{\mathfrak{F}}(f_i | z) \} \quad (19)$$

In above equations $E_z\{\cdot\}$ denotes the expectation over $P(z_k)$, the probability of semantic concept variables. (18) provides a principled way to determine the probability of word $w^j$ for annotating image $f_i$. With the combination of (18) and (19), the automatic image annotation can be solved fully in the Bayesian framework.

In practice, an approximation of the expectation in (18) is derived by utilizing Monte Carlo sampling [12] technique.

Applying Monte Carlo integration to (18) derives $$P(w^j \mid f_i) \approx \frac{\sum_{k=1}^{K} P_V(w^j \mid z_k) P_{\tilde{\mathcal{F}}}(f_i \mid z_k)}{\sum_{h=1}^{K} P_{\tilde{\mathcal{F}}}(f_i \mid z_h)} \quad (20)$$

$$= \sum_{k=1}^{K} P_V(w^j \mid z_k) x_k \text{ where}$$

$$x_k = \frac{P_{\tilde{\mathcal{F}}}(f_i \mid z_k)}{\sum_{h=1}^{K} P_{\tilde{\mathcal{F}}}(f_i \mid z_h)}.$$

The words with the top highest $P(w^j|f_i)$ are returned to annotate the image. Given this image annotation scheme, the image-to-text retrieval may be performed by retrieving documents for the returned words based on traditional text retrieval techniques. For example, the returned word list may be a predetermined number of words, all words exceeding a probability threshold, or the set of words whose aggregate probabilities exceed a threshold, or a hybrid of these schemes.

Text-to-Image Retrieval

Traditional text-based image retrieval systems, such as the commercial Web search engines, solely use textual information to index images. It is generally accepted that this approach fails to achieve a satisfactory image retrieval, and this perceived failure has actually motivated the CBIR research. Based on the model obtained above to explicitly exploit the synergy between imagery and text, an alternative and much more effective approach to traditional CBIR, using the Bayesian framework to image retrieval given a text query, is provided.

Similar to the derivation in the Image Annotation and Image-to-Text Retrieval section above, we retrieve images for word queries by determining the conditional probability $P(f_i|w_j)$ $$P(f_i \mid w^j) = \int P_{\tilde{\mathcal{F}}}(f_i \mid z) P(z \mid w^j) dz \quad (21)$$

$$= \int P_V(w^j \mid z) \frac{P_{\tilde{\mathcal{F}}}(f_i \mid z) P(z)}{P(w^j)} dz$$

$$= E_z \left\{ \frac{P_V(w^j \mid z) P_{\tilde{\mathcal{F}}}(f_i \mid z)}{P(w^j)} \right\}$$

The expectation can be estimated as follows:

$$P(f_i \mid w^j) \approx \frac{\sum_{k=1}^{K} P_V(w^j \mid z_k) P_{\tilde{\mathcal{F}}}(f_i \mid z_k)}{\sum_{h=1}^{K} P_V(w^j \mid z_h)}$$

$$= \sum_{k=1}^{K} P_{\tilde{\mathcal{F}}}(f_i \mid z_k) y_k$$

where $$y_k = \frac{P_V(w^j \mid z_k)}{\sum_{h} P_V(w^j \mid z_h)}.$$

The images in the database with the top highest $P(f_i|w^j)$ are returned as the retrieval result for each query word.

EXAMPLE 1

Figure 2:
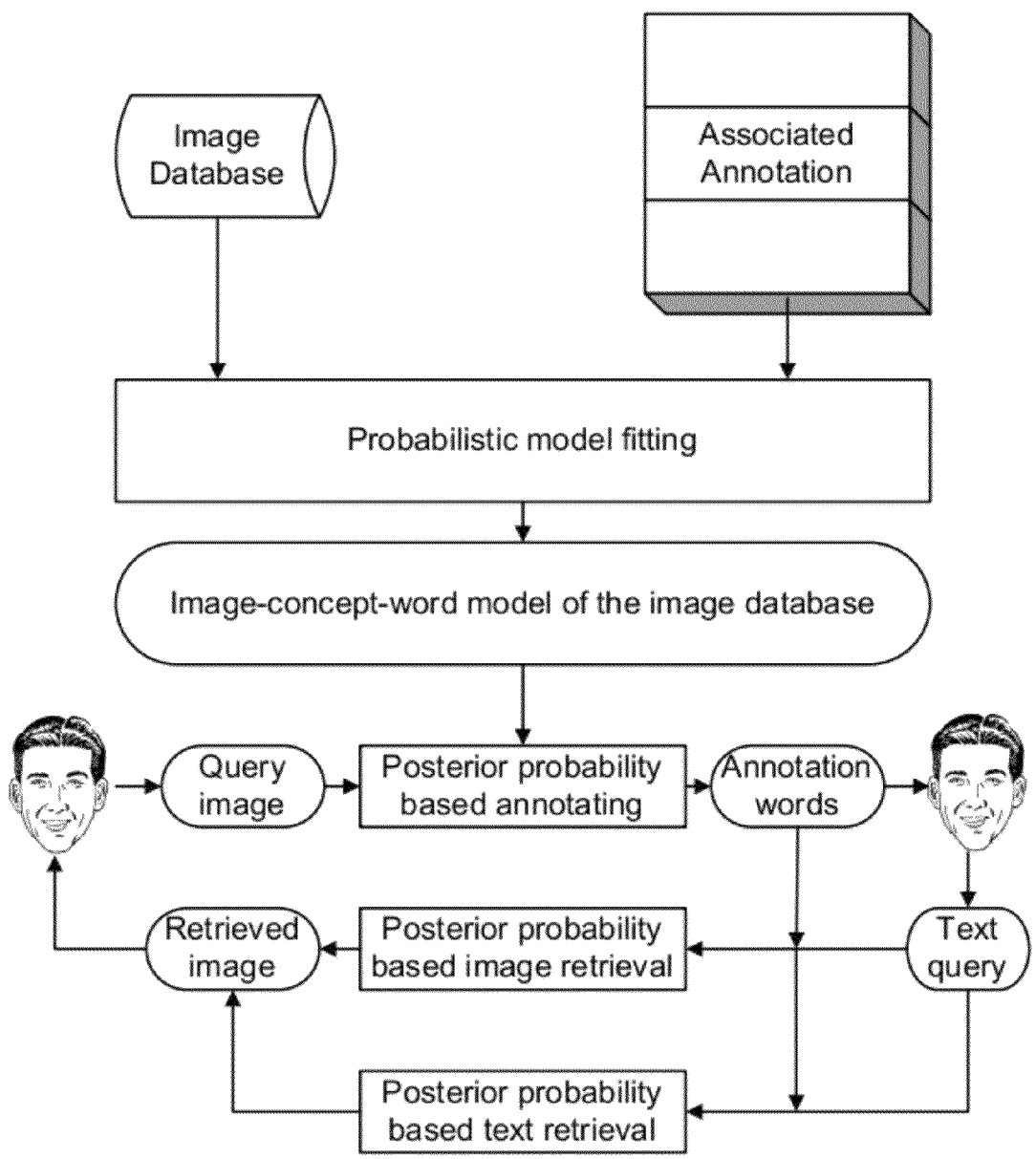
FIG. 2 shows a block diagram of the architecture of the system.

A prototype system was implemented in accordance with the framework set forth above. The architecture of the prototype system is illustrated in FIG. 2, where the "image database" contains the training images as well as testing images; the "associated annotation" contains all the training annotation words. The process of probabilistic model fitting to generate the image-concept-word model (the shaded area in FIG. 2) is processed offline; the text querying and image querying based on the Bayesian framework (the unshaded area in FIG. 2) are performed online.

The system supported both image-to-text (i.e., image annotation) and text-to-image retrievals. As shown in FIG. 2, the image-to-image querying also can be conducted in the system by incorporating the existing commercial text-based image search engines, i.e., the obtained annotation words for the query image are input into an text-based image search engine to retrieve images. Alternatively, the image-to-image retrieval may be conducted by first calling the image-to-text retrieval and then using the retrieved words to conduct the text-to-image retrieval collectively.

Of course, it is also possible to employ the prototype system to retrieve an image output set corresponding to an input image or image set, or to employ two prototype systems linked through either a word query linkage, or bypassing the output layer and linking the hidden layers of each system directly. Note that in this later system, there would be two hidden layers, the interconnections of which must be optimized separately. For example, two separate information domains, each comprising a set of images and words may be provided. Note that, while the formulation of the hidden concept layer is dependent on consistency of the semantic framework of the words used in training, the word usage need not be consistent between the two sets. Rather, the concepts "extracted" from the image-word relationships are anticipated to be consistent. The hidden concepts of the first domain are then mapped to the hidden concepts of the second domain using a second training process. For example, all or a portion of images of the first domain are submitted to the second domain and/or vice versa, and the interconnections of respective hidden concepts optimized to yield minimum error. Efficiencies are obtained by selecting or synthesizing training images for one or both domains which represent exemplars for respective hidden concepts. Alternately, preexisting common images in both domains may be employed to normalize the respective mapping. Further, it is also possible to map the word output of a complete prototype system to another prototype system. It is noted that in the general case, the word output will be considered normalized, and therefore no training or mapping will be required for use of the output of one network as the input for another network.

The word output of a network may be analyzed using traditional linguistic techniques, without departing from the scope and spirit of the present invention. Thus, for example, a semantic taxonomy may be employed to derive express concepts from the word output, or to modify the word input. Note that the express concepts need not be related to the hidden concepts, although according to general understanding, there will be some correlation.

When implemented in a search system, the input may include both an image and text. For example, an exemplar web page may serve as a starting point for retrieval of similar pages. Thus, a trained network may be used in a hybrid environment, as a text to image, image to text, image-to-image and text+image to image and/or text system. Typically, a text-to-text system would not employ the present invention, unless perhaps it is used as an automated language translation system, in which text input is converted to "concepts", which are then mapped to a different text output.

While the system according to the present invention can operate with unprocessed images, it may benefit from pre-processing of images. For example, textual features within images may be extracted using optical character recognition technology, and serve as a separate input or query. Object extraction processing may be used to separate various components from an image or stream, each of which may serve as a separate input or component of an input. Other types of processing may be employed to characterize or otherwise parse an input image. An advantage of separate preprocessing of the image is that, in some special cases, a heuristic or predefined feature extraction scheme may improve the semantic extraction performance of the composite Bayesian+object-based image annotation and retrieval system.

The processing of images using heuristics and/or object extraction processing schemes is known, and such known techniques may be advantageously used in accordance with the present invention.

EXAMPLE 2

Dataset and Feature Sets

It has been noted that the data sets used in most recent automatic image annotation systems [1, 10, 11, 17] fail to capture the difficulties inherent in many real image databases. Thus, publications reporting performance based on artificially constrained data sets may not be comparable to those using less constrained or unconstrained data sets.

The commonly used Corel database, for example, is much easier for image annotation and retrieval than the unconstrained image data set due to its limited semantics conveyed and relatively small variations of visual contents. The typical small scales of the datasets reported in the literature are far away from being realistic in all the real world applications.

Figure 3:
FIG. 3 shows an example of image-annotation-word pairs in the generated database, in which the number following each word is the corresponding weight of the word.

The prototype system according to the present invention was therefore evaluated on a collection of large-scale real world data automatically crawled from the Web, as an example of a minimally constrained image data set. The images and the surrounding text describing the image contents in web pages were extracted from the blocks containing the images by using the VIPS algorithm [4]. The surrounding text is processed using the standard text processing techniques to obtain the annotation words. Apart from images and annotation words, the weight of each annotation word for images was computed by using a scheme incorporating TF, IDF, and the tag information in VIPS, and was normalized to range (0,10). The image annotation word pairs were stemmed and manually cleaned before using as the training database for model fitting and testing. The data collection consisted of 17,000 images and 7,736 stemmed annotation words. Among them, 12,000 images were used as the training set and the remaining 5,000 images were used for the testing purpose. Compared with images in the Corel database, the images in this set were more diverse both on semantics and on visual appearance, which reflect the true nature of image search in many real applications. FIG. 3 shows an image example with the associated annotation words in the generated database.

The present example does not focus on image feature selection and the approach is independent of any visual features. As stated above, various image feature processing techniques may also be employed in conjunction with this technique. For implementation simplicity and fair comparison purpose, similar features to those used in [11] are used in the prototype system. Specifically, a visual feature is a 36 dimensional vector, consisting of 24 color features (auto correlogram computed over 8 quantized colors and 3 Manhattan Distances) and 12 texture features (Gabor energy computed over 3 scales and 4 orientations).

Experiment Design

To evaluate the effectiveness and the promise of the prototype system for image annotation and multi-model image retrieval, the following performance measures are defined:

Hit-Rate3 (HR3): the average rate of at least one word in the ground truth of a test image is returned in the top 3 returned words for the test set.

Complete-Length (CL): the average minimum length of returned words which contains all the ground truth words for a test image for the test set.

Single-Word-Query-Precision (SWQP(n)): the average rate of relevant images (here 'relevant' means that the ground truth annotation of this image contains the query word) in the top n returned images for a single word query for the test set.

HR3 and CL measure the accuracy of image annotation (or the image-to-text retrieval); the higher the HR3, and/or the lower the CL, the better the annotation accuracy. SWQP(n) measures the precision of text-to-image retrieval; the higher the SWQP(n), the better the text-to-image retrieval precision.

Furthermore, we also measure the image annotation performance by using the annotation recall and precision defined in [11].

$$\text{recall} = \frac{B}{C}$$

and $$\text{precision} = \frac{B}{A},$$

where A is number of images automatically annotated with a given word in the top 10 returned word list; B is the number of images correctly annotated with that word in the top-10-returned-word list; and C is the number of images having that word in ground truth annotation. An ideal image annotation system would have a high average annotation recall and annotation precision simultaneously.

Results of Automatic Image Annotation

In the prototype system, words and their confidence scores (conditional probabilities) are returned to annotate images upon users' querying.

Applying the method of estimating the number of hidden concepts described above with respect to the training set, the number of the concepts was determined to be 262. Compared with the number of images in the training set, 12,000, and the number of stemmed and cleaned annotation words, 7,736, the number of semantic concept variables was far less.

In terms of computational complexity, the model fitting was a computation-intensive process; it took 45 hours to fit the model to the training set on a Pentium IV 2.3 GHZ computer with 1 GB memory. However, this process was performed offline and only once. For online image annotation and single word image query, the response time is generally acceptable (less than 1 second).

To show the effectiveness and the promise of the probabilistic model in image annotation, the accuracy of prototype system was compared with that of MBRM [11]. In MBRM, the word probabilities are estimated using a multiple Bernoulli model and no association layer between visual features and words is used. The prototype system was compared with MBRM because MBRM reflects the performance of the state-of-the-art automatic image annotation research. In addition, since the same image visual features are used in MBRM, a fair comparison of the performance is expected.

Figure 5:
FIG. 5 shows a table of examples of automatic annotations produced by the prior art MBRM technique and the technique according to a preferred embodiment of the invention.
Figure 5:
Figure 5:
Figure 5:
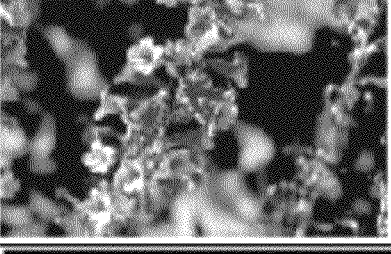
Figure 5:

FIG. 5 shows examples of the automatic annotation obtained by the prototype system and MBRM on the test image set. Here, the top 5 words (according to probability) are taken as automatic annotation of the image. It clearly indicates that the prototype system performs better than MBRM. The systematic evaluation results are shown for the test set in Table 1. Results are reported for all (7736) words in the database. The system implemented in accordance with the present invention clearly outperforms MBRM. As is shown, the average recall improves 48% and the average precision improves 69%. The multiple Bernoulli generation of words in MBRM is artificial and the association of the words and features is noisy. On the contrary, in accordance with the present invention, no explicit word distribution is assumed and the synergy between the visual features and words exploited by the hidden concept variables reduces the noises substantially.

TABLE 1

Performance comparison on the task of automatic image annotation on the test set

| Models | MBRM | Our Model |
|---|---|---|
| HR3 | 0.56 | 0.83 |
| CL | 1265 | 574 |
| #words with recall > 0 | 3295 | 6078 |
| Results on all 7736 words | | |
| Average Per-word Recall | 0.19 | 0.28 |
| Average Per-word Precision | 0.16 | 0.27 |

Figure 4:
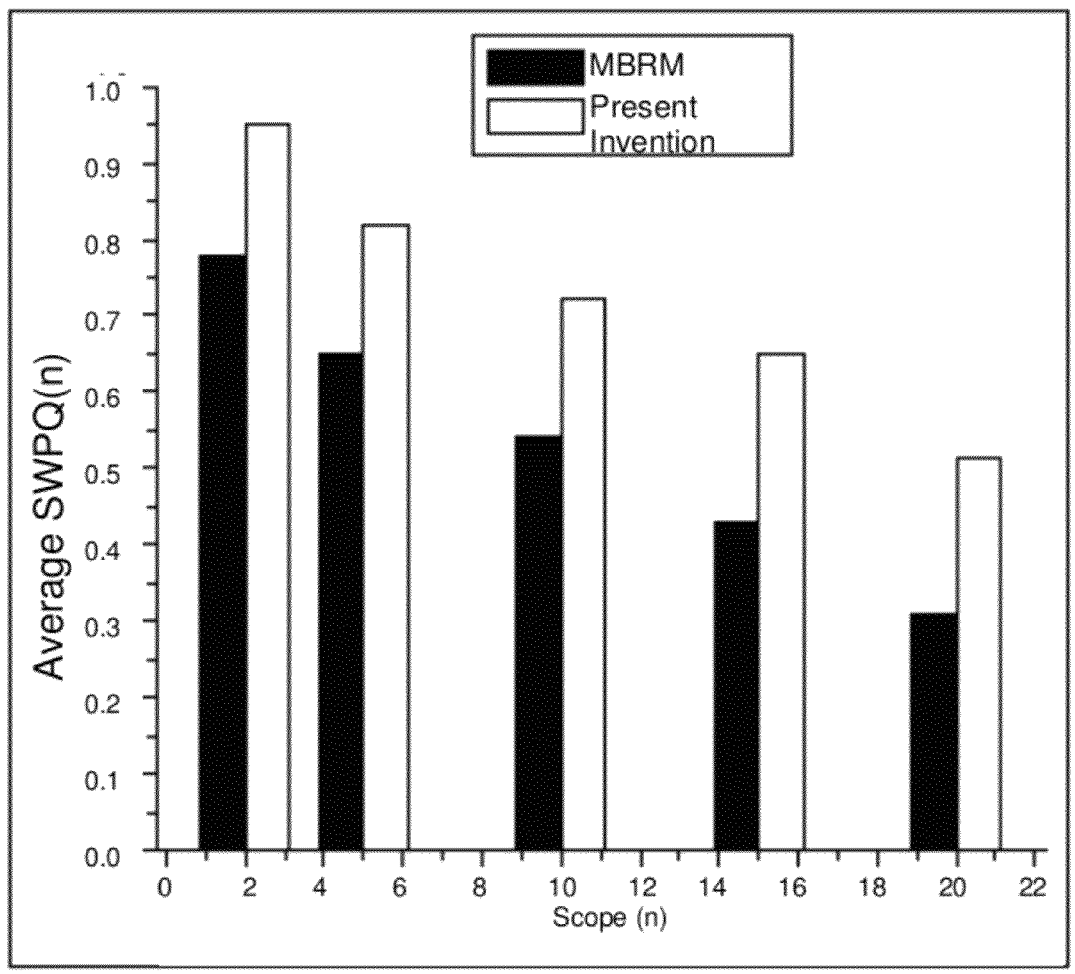
FIG. 4 shows a graph of the average SWQP(n) comparisons between the prior art MBRM technique and the technique according to a preferred embodiment of the invention.

The system in accordance with the present invention provides better performance. Some returned words with top rank from the prototype system for a given image are found semantically relevant by subjective examinations, although they are not contained in the ground truth annotation of the image. These words were not counted in the computation of the performance in Table 1; consequently, the HR3, recall, and precision in the table may actually be underestimated while the CL may be overestimated for the prototype system.
Results of Single Word Text-to-Image Retrieval The single word text-to-image retrieval results on a set of 500 randomly selected query words are shown in FIG. 4. The average SWQP (2, 5, 10, 15, 20) of the prototype system and those of MBRM are recorded. A returned image is considered as relevant to the single word query if this word is contained in the ground truth annotation of the image.

It is shown that the performance of the probabilistic model in accordance with the present invention has higher overall SWQP than that of MBRM. It is also noticeable that when the scope of returned images increases, the SWQP(n) in the prototype system attenuates more gracefully than that in MBRM, which is another advantage of the present invention.

The present invention provides a probabilistic semantic model for automatic image annotation and multi-modal image retrieval. Instead of assuming artificial distribution of annotation word and the unreliable association evidence used in many existing approaches, the present invention assumes a hidden concept layer as the connection between the visual features and the annotation words, to explicitly exploit the synergy between the two modalities. The hidden concept variables are discovered and the corresponding probabilities are determined by fitting the generative model to the training set.

The model fitting is performed in the criterion of MLE and an EM based iterative learning procedure is developed. Based on the model obtained, the image-to-text and text-to-image retrievals are conducted in a Bayesian framework, which is adaptive to the data set and has clear interpretation of confidence measures. The model according to the present invention may be advantageously used for image annotation and multi-model image retrieval, which was demonstrated by the evaluation of a prototype system on 17,000 images and the automatically extracted annotation words from crawled Web pages. In comparison with a state-of-the-art image annotation system, MBRM, the present invention shows a higher reliability and superior effectiveness.

In order to reduce training time, it may be possible to use sampling techniques and prior knowledge (e.g., category information of web pages).

APPENDIX A

References

Each of which is Expressly Incorporated Herein by Reference

[1] K. Barnard, P. Duygulu, N. d. Freitas, D. Blei, and M. I. Jordan. Matching words and pictures. *Journal of Machine Learning Research*, 3:1107-1135, 2003.

[2] D. Blei and M. Jordan. Modeling annotated data. In *the 26th International Conference on Research and Development in Information Retrieval (SIGIR)*, 2003.

[3] D. Blei, A. Ng, and M. Jordan. Dirichlet allocation models. In *The International Conference on Neural Information Processing Systems*, 2001.

[4] D. Cai, S. Yu, J.-R. Wen, and W.-Y. Ma. Vips: a vision-based page segmentation algorithm. Microsoft Technical Report (MSRTR-2003-79), 2003.

[5] C. Carson, M. Thomas, and e. a. S. Belongie. Blobworld: A system for region-based image indexing and retrieval. In *The 3rd Int'l Conf. on Visual Information System Proceedings*, pages 509-516, Amsterdam, Netherlands, June 1999.

[6] E. Chang, K. Goh, G. Sychay, and G. Wu. Cbsa: Content-based soft annotation for multimodal image retrieval using bayes point machines. *IEEE Trans. on Circuits and Systems for Video Technology*, 13(1), January 2003.

[7] Y. Chen and J. Z. Wang. A region-based fuzzy feature matching approach to content-based image retrieval. *IEEE Trans. on PAMI*, 24(9):1252-1267, 2002.

[8] A. Dempster, N. Laird, and D. Rubin. Maximum likelihood from incomplete data via the em algorithm. *Journal of Royal Statistical Society*, 39(1):1-38, 1977.

[9] W. R. Dillon and M. Goldstein. *Multivariate Analysis, Mehtods and Applications*. John Wiley and Sons, New York, 1984.

[10] P. Duygulu, K. Barnard, J. F. G. d. Freitas, and D. A. Forsyth. Object recognition as machine translation: Learning a lexicon for a fixed image vocabulary. In *The 7th European Conference on Computer Vision*, volume IV, pages 97-112, Copenhagon, Denmark, 2002.

[11] S. L. Feng, R. Manmatha, and V. Lavrenko. Multiple bernoulli relevance models for image and video annotation. In *The International Conference on Computer Vision and Pattern Recognition*, Washington, D.C., June, 2004.

[12] G. Fishman. *Monte Carlo Concepts, Algorithms and Applications*. Springer Verlag, 1996.

[13] T. Hofmann. Unsupervised learning by probabilistic latent semantic analysis. *Machine Learning*, 42:177-196, 2001.

[14] T. Hofmann & J. Puzicha. Statistical models for co-occurrence data. *AI Memo*, 1625, 1998.

[15] T. Hofmann, J. Puzicha, and M. I. Jordan. Unsupervised learning from dyadic data. In *The International Conference on Neural Information Processing Systems*, 1996.

[16] V. Lavrenko, R. Manmatha, and J. Jeon. A model for learning the semantics of pictures. In *the International Conference on Neural Information Processing Systems (NIPS'03)*, 2003.

[17] J. Li and J. Z. Wang. Automatic linguistic indexing of pictures by a statistical modeling approach. *IEEE Trans. on PAMI*, 25(9), September 2003.

[18] G. Mclachlan and K. E. Basford. *Mixture Models*. Marcel Dekker, Inc., Basel, N.Y., 1988.

[19] Y. Mori, H. Takahashi, and R. Oka. Image-to-word transformation based on difiding and vector quantizing images with words. In *the First International Workshop on Multimedia Intelligent Storage and Retrieval Management*, 1999.

[20] J. Rissanen. *Stochastic Complexity in Statistical Inquiry*. World Scientific, 1989.

[21] A. W. M. Smeulders, M. Worring, S. Santini, A. Gupta, and R. Jain. Content-based image retrieval at the end of the early years. *IEEE Trans. on Pattern Analysis and Machine Intelligence*, 22:1349-1380, 2000.

[22] J. Z. Wang, J. Li, and gio Wiederhold. Simplicity: Semanticssensitive integrated matching for picture libraries. *IEEE Trans. on PAMI*, 23(9), September 2001.

[23] X.-J. Wang, W.-Y. Ma, G.-R. Xue, and X. Li. Multi-model similarity propagation and its application for web image retrieval. In *the 12th annual ACM international conference on Multimedia*, pages 944-951, New York City, N.Y., 2004.

[24] T. Westerveld and A. P. de Vries. Experimental evaluation of a generative probabilistic image retrieval model on 'easy' data. In *the SIGIR Multimedia Information Retrieval Workshop 2003*, August 2003.

[25] Z. M. Zhang, R. Zhang, and J. Ohya. Exploiting the cognitive synergy between different media modalities in multimodal information retrieval. In *the IEEE International Conference on Multimedia and Expo (ICME'04)*, Taipei, Taiwan, July 2004.

[26] R. Zhao and W. I. Grosky. Narrowing the semantic gap—improved text-based web document retrieval using visual features. *IEEE Trans. on Multimedia*, 4(2), 2002.

The invention claimed is:

1. A method of retrieving media, comprising:
   (a) defining a probabilistic framework organizing media with respect to concepts represented in the respective media comprising at least one hidden layer;
   (b) automatically mapping elements of a set of media to the probabilistic framework, using at least one processor, based on implicit concepts represented within each element of the set of media, the probabilistic framework comprising at least one joint probability distribution which models a probability that a symbol belonging to a respective concept is an annotation symbol of respective media;
   (c) automatically determining, using at least one processor, at least one implicit concept represented in a received query;
   (d) automatically determining, using at least one processor, a probabilistic correspondence of elements of the set of media with the determined at least one implicit concept; and
   (e) outputting at least one representation or identifier of at least one element of the set of media selectively in dependence on at least the determined probabilistic correspondence.

2. The method according to claim 1, wherein the probabilistic framework is organized according to semantic concepts, and the query comprises media having implicit semantic concepts expressed in a non-semantic form.

3. The method according to claim 1, wherein the query comprises an image, and wherein the image is processed to determine implicit semantic characteristics of an image content.

4. The method according to claim 1, wherein at least one semantic word is associated with the received query as an implicit semantic concept, the probabilistic framework is a semantic probabilistic framework, and the at least one semantic word is used to search the mapped elements within the probabilistic semantic framework.

5. The method according to claim 1, wherein the at least one representation or identifier of at least one element of the set of media is output in ranked order selectively in dependence on at least the determined probabilistic correspondence.

6. The method according to claim 1, wherein the query comprises an image, and said automatically determining comprises associating words with the image using a Bayesian model comprising a hidden concept layer which connects a visual feature layer and a word layer, which is discovered by fitting a generative model to a training set comprising images and annotation words, wherein the conditional probabilities of the visual features and the annotation words given a hidden concept class are determined based on an Expectation-Maximization (EM) based iterative learning procedure.

7. A method of ranking multimedia works with respect to a query, comprising:
   (a) defining a semantic Bayesian framework representing an association of a multimedia work content with a plurality of semantic concepts, comprising at least one hidden layer formulated based on at least one joint probability distribution which models a probability that a word belonging to a respective semantic concept is an annotation word of a respective multimedia work;
   (b) automatically mapping a set of multimedia works to the semantic Bayesian framework dependent on semantic concepts represented in respective multimedia works, using at least one processor which automatically determines a set of annotation words associated with the respective multimedia works;
   (c) automatically extracting at least one implicit semantic concept from a received query seeking elements of the set of multimedia works corresponding to at least one implicit semantic concept, using at least one processor;

(d) automatically determining elements of the mapped set of multimedia works corresponding to the at least one extracted implicit semantic concept, using at least one processor; and (e) outputting the corresponding multimedia works ranked in accordance with at least a correspondence to the at least one extracted implicit semantic concept.

8. The method according to claim 7, wherein the multimedia works comprise annotated images, and the query comprises an image.

9. The method according to claim 8, wherein the query comprises an image, and said automatically determining comprises associating words with the image using a Bayesian model comprising a hidden concept layer which connects a visual feature layer and a word layer, which is discovered by fitting a generative model to a training set comprising images and annotation words, wherein the conditional probabilities of the visual features and the annotation words given a hidden concept class are determined based on an Expectation-Maximization (EM) based iterative learning procedure.

10. A method of extracting probable implicit semantic concepts of a multimedia work, comprising:
(a) defining a probabilistic framework relating a correspondence of automatically derived non-semantic content features of each of a plurality of multimedia works with semantic content features of each respective multimedia work, comprising at least one hidden concept layer comprising at least one joint probability distribution which models a probability that a symbol belonging to a respective semantic concept is an appropriate annotation of a respective multimedia work;
(b) receiving an input comprising at least non-semantic content of a multimedia work; and
(c) automatically producing as an output by a processor, a semantic concept vector associated with the input, representing probable implicit semantic concepts represented by the input, based on at least a correspondence of the non-semantic content features of the input with the semantic concepts of the probabilistic framework.

11. The method according to claim 10, wherein the probabilistic framework comprises a Bayesian model for associating words with an image, wherein the hidden concept layer which connects a visual feature layer and a word layer which is discovered by fitting a generative model to a training set comprising images and annotation words, wherein the conditional probabilities of the visual features and the annotation words given a hidden concept class are determined based on an Expectation-Maximization (EM) based iterative learning procedure.

12. A method of extracting probable implicit semantic concepts of a multimedia work, comprising:
(a) defining a probabilistic framework relating a correspondence of non-semantic content features of each of a plurality of multimedia works with semantic content features of each respective multimedia work, comprising at least one hidden concept layer;
(b) receiving an input comprising at least non-semantic content; and
(c) automatically presenting as an output a semantic concept vector associated with the input, representing probable implicit semantic concepts represented by the input, based on at least a correspondence of the non-semantic content features of input with the probabilistic framework,
wherein the probabilistic framework comprises a Bayesian model for associating words with an image, wherein the hidden concept layer which connects a visual feature layer and a word layer which is discovered by fitting a generative model to a training set comprising images and annotation words, wherein the conditional probabilities of the visual features and the annotation words given a hidden concept class are determined based on an Expectation-Maximization (EM) based iterative learning procedure, and wherein $f_i$, $i\epsilon[1,N]$ denotes a visual feature vector of images in a training database, where N is the size of the database. $w^j$, $j\epsilon[1,M]$ denotes the distinct textual words in a training annotation word set, where M is the size of annotation vocabulary in the training database, the visual features of images in the database, $f_i=[f_i^1, f_i^2, \ldots, f_i^L]$, $i\epsilon[1,N]$ are known i.i.d. samples from an unknown distribution, having a visual feature dimension L, the specific visual feature annotation word pairs $(f_i, w^j)$, $i\epsilon[1,N]$, $j\epsilon[1,M]$ are known i.i.d. samples from an unknown distribution, associated with an unobserved semantic concept variable $z\epsilon Z=\{a_1, \ldots z_k\}$, in which each observation of one visual feature $f\epsilon F=\{f_1, f_2, \ldots, f_N\}$ belongs to one or more concept classes $z_k$ and each observation of one word $w\epsilon V=\{w^1, w^2, \ldots, w^M\}$ in one image $f_i$ belongs to one concept class, in which the observation pairs $(f_i, w^j)$ are assumed to be generated independently, and the pairs of random variables $(f_i, w^j)$ are assumed to be conditionally independent given the respective hidden concept $z_k$, such that $$P(f_i, w^j | z_k) = p_{\Im}(f_i | z_k) P_V(w^j | z_k);$$

the visual feature and word distribution is treated as a randomized data generation process, wherein a probability of a concept is represented as $P_z(z_k)$; a visual feature is selected $f_i\epsilon F$ with probability $P_{\Im}(f_i | z_k)$; and a textual word is selected $w^j\epsilon V$ with probability $P_V(w^j | z_k)$, from which an observed pair $(f_i, w^j)$ is obtained, such that a joint probability model is expressed as follows:

$$P(f_i, w^j) = P(w^j) P(f_i | w^j)$$

$$= P(w^j) \sum_{k=1}^{K} P_{\Im}(f_i | z_k) P(z_k | w^j)$$

$$= \sum_{k=1}^{K} P_z(z_k) P_{\Im}(f_i | z_k) P_V(w^j | z_k),$$

and the visual features are generated from K Gaussian distributions, each one corresponding to a $z_k$, such that for a specific semantic concept variable $z_k$, the conditional probability density function of visual feature $f_i$ is expressed as:

$$P_{\Im}(f_i | z_k) = \frac{1}{2\pi^{L/2} |\Sigma_k|^{1/2}} e^{-\frac{1}{2}(f_i - \mu_k)^T \Sigma_k^{-1} (f_i - \mu_k)}$$

where $\Sigma_k$ and $\mu_k$ are the covariance matrix and mean of visual features belonging to $z_k$, respectively; and word concept conditional probabilities $P_V(\cdot | Z)$, i.e., $P_V(w^j | z_k)$ for $k\epsilon[1,K]$, are estimated through fitting the probabilistic model to the training set.

13. The method according to claim 12, in which $P_{\Im}(f_i | z_k)$ is determined by maximization of the log-likelihood function:

$$\log \prod_{i=1}^{N} P_{\mathcal{F}}(f_i \mid Z)^{u_i} = \sum_{i=1}^{N} u_i \log \left( \sum_{k=1}^{K} P_z(z_k) p_{\mathcal{F}}(f_i \mid z_k) \right)$$

where $u_i$ is the number of annotation words for image $f_i$, and $P_z(z_k)$ and $P_V(w^j|z_k)$ are determined by maximization of the log-likelihood function:

$$\mathcal{L} = \log P(F, V) = \sum_{i=1}^{N} \sum_{j=1}^{M} n(w_i^j) \log P(f_i, w^j)$$

where $n(w_i^j)$ denotes the weight of annotation word $w^j$, i.e., occurrence frequency, for image $f_i$; and the model is resolved by applying the expectation-maximization (EM) technique, comprising:

(i) an expectation (E) step where the posterior probabilities are computed for the hidden variable $z_k$ based on the current estimates of the parameters; and (ii) an maximization (M) step, where parameters are updated to maximize the expectation of the complete-data likelihood log P (F,V,Z) given the posterior probabilities computed in the preceding E-step, whereby the probabilities can be iteratively determined by fitting the model to the training image database and the associated annotations.

14. The method according to claim 13, wherein Bayes' rule is applied to determine the posterior probability for $z_k$ under $f_i$ and $(f_i, w^j)$:

$$p(z_k \mid f_i) = \frac{P_z(z_k) p_{\mathcal{F}}(f_i \mid z_k)}{\sum_{k=1}^{K} P_z(z_t) P_{\mathcal{F}}(f_i \mid z_t) P_V(w^j \mid z_t)}$$

$$p(z_k \mid f_i, w^j) = \frac{P_z(z_k) P_z(f_i \mid z_k) P_V(w^j \mid z_k)}{\sum_{k=1}^{K} P_z(z_t) P_{\mathcal{F}}(f_i \mid z_t) P_V(w^j \mid z_t)}$$

and expectation of the complete-data likelihood log P (F,V,Z) for the estimated log P(F|V,Z) is $$\sum_{(i,j)=1}^{K} \sum_{i=1}^{N} \sum_{j=1}^{M} n(w_i^j) \log \left[ P_z(z_{i,j}) p_{\mathcal{F}}(f_i \mid z_{i,j}) P_V(w^j \mid z_{i,j}) \right] P(Z \mid F, V)$$

where $$P(Z \mid F, V) = \prod_{s=1}^{N} \prod_{t=1}^{M} P(z_{s,t} \mid f_s, w^t)$$

and the notation $z_{i,j}$ is the concept variable that associates with the feature-word pair $(f_i, w^j)$.

15. The method according to claim 13, wherein the expectation of the likelihood log P(F,Z) for the estimated P(Z|F) is expressed as:

$$\sum_{k=1}^{K} \sum_{i=1}^{N} \log \left( P_z(z_k) p_{\mathcal{F}}(f_i \mid z_k) \right) p(z_k \mid f_i)$$

and the expectation of log P(F,V,Z) and log P(F|V,Z) are maximized with Lagrange multipliers to $P_z(z_l)$, $p_{\mathcal{F}}(f_u|z_l)$ and $P_V(w^v|z_l)$, under the normalization constraints $$\sum_{k=1}^{K} P_z(z_k) = 1, \quad \sum_{k=1}^{K} P(z_k \mid f_i, w^j) = 1$$

for any $f_i$, $w^j$ and $z_l$, the parameters being determined as $$\mu_k = \frac{\sum_{i=1}^{N} u_i f_i p(z_k \mid f_i)}{\sum_{s=1}^{N} u_s p(z_k \mid f_s)}$$

$$\sum_k = \frac{\sum_{i=1}^{N} u_i p(z_k \mid f_i)(f_i - \mu_k)(f_i - \mu_k)^T}{\sum_{s=1}^{N} u_s p(z_k \mid f_s)}$$

$$P_z(z_k) = \frac{\sum_{j=1}^{M} \sum_{i=1}^{N} u(w_i^j) P(z_k \mid f_i, w^j)}{\sum_{j=1}^{M} \sum_{i=1}^{N} n(w_i^j)}$$

$$P_V(w^j \mid z_k) = \frac{\sum_{i=1}^{N} n(w_i^j) P(z_k \mid f_i, w^j)}{\sum_{u=1}^{M} \sum_{V=1}^{N} n(w_V^u) P(z_k \mid f_V, w^u)}.$$

16. The method according to claim 15, in which the number of concepts, K, is choosen to maximize $$\log(P(F, V)) - \frac{m_K}{2} \log(MN)$$

where $m_K$ is the number of free parameters needed for a model with K mixture components;

and $m_K = (K-1) + K(M-1) + K(N-1) + L^2 = K(M+N-1) + L^2 - 1$.

17. The method according to claim 16, wherein a joint distribution is used to model the probability of an event that a word $w^3$ belonging to semantic concept $z_k$ is an annotation word of image $f_i$:

$$P(w^j, z_k, f_i) = P_z(Z_k) p_{\mathcal{F}}(f_i \mid z_k) P_V(w^j \mid z_k)$$

-continued $$P(w^j \mid f_i) = \int P_V(w^j \mid z) p(z \mid f_i) dz$$

$$= \int P_V(w^j \mid z) \frac{p_{\mathcal{F}}(f_i \mid z) P(z)}{p(f_i)} dz$$

$$= E_z \left\{ \frac{P_V(w^j \mid z) p_{\mathcal{F}}(f_i \mid z)}{p(f_i)} \right\}$$

or
where $p(f_i) = \int p_{\mathcal{F}}(f_i \mid z) P_z(z) dz = E_z\{p_{\mathcal{F}}(f_i \mid z)\}$, and $E_z\{\bullet\}$ denotes the expectation over $P(z_k)$; and
a Monte Carlo integration is used to derive $$P(w^j \mid f_i) \approx \frac{\sum_{k=1}^{K} P_V(w^j \mid z_k) p_{\mathcal{F}}(f_i \mid z_k)}{\sum_{h=1}^{K} p_{\mathcal{F}}(f_i \mid z_h)}$$

$$= \sum_{k=1}^{K} P_V(w^j \mid z_k) x_k$$

where $x_k = \dfrac{p_{\mathcal{F}}(f_i \mid z_k)}{\sum_{h=1}^{K} p_{\mathcal{F}}(f_i \mid z_h)}$, and wherein the words with the top highest $P(w^j|f_i)$ are returned to annotate the image.

18. The Bayesian model according to claim 13, wherein images are retrieved for word queries by determining the conditional probability $P(f_i|w_j)$ $$P(f_i \mid w^j) = \int P_{\mathcal{F}}(f_i \mid z) P(z \mid w^j) dz$$

$$= \int P_V(w^j \mid z) \frac{p_{\mathcal{F}}(f_i \mid z) P(z)}{P(w^j)} dz$$

$$= E_z \left\{ \frac{P_V(w^j \mid z) p_{\mathcal{F}}(f_i \mid z)}{P(w^j)} \right\}$$

in which the expectation is estimated as follows:

$$P(f_i \mid w^j) \approx \frac{\sum_{k=1}^{K} P_V(w^j \mid z_k) p_{\mathcal{F}}(f_i \mid z_k)}{\sum_{h=1}^{K} P_V(w^j \mid z_h)}$$

$$= \sum_{k=1}^{K} p_{\mathcal{F}}(f_i \mid z_k) y_k$$

where $y_k = \dfrac{P_V(w^j \mid z_k)}{\sum_{h} P_V(w^j \mid z_h)}$, and wherein the images in the database with the top highest $P(f_i|w^j)$ are returned as the retrieval result for each query word.

19. The method according to claim 1, wherein the symbol comprises a word and the and the annotation symbol comprises an annotation word, wherein a plurality of symbols belong to at least one respective concept, such that the association of the respective media with implicit concepts is through automatically generated annotation symbols and analysis of the joint probability distribution.

20. The method according to claim 7, wherein a plurality of word belong to at least one respective semantic concept, such that the association of the respective multimedia with the plurality of semantic concepts is through automatically generated annotation words and analysis of the joint probability distribution.

\* \* \* \* \*